(12) United States Patent
Baker (10) Patent No.: US 9,836,786 B1
(45) Date of Patent: Dec. 5, 2017

(54) INTELLIGENT DIVISION OF FUNDS ACROSS MERCHANT ACCOUNTS

(71) Applicant: Square, Inc., San Francisco, CA (US)

(72) Inventor: Ginger Kay Baker, Montara, CA (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 14/540,947

(22) Filed: Nov. 13, 2014

(51) Int. Cl.
| | |
|---|---|
| *G06Q 20/04* | (2012.01) |
| *G06Q 40/00* | (2012.01) |
| *G06Q 20/20* | (2012.01) |
| *G06Q 20/40* | (2012.01) |

(52) U.S. Cl.
CPC ............ *G06Q 40/00* (2013.01); *G06Q 20/20* (2013.01); *G06Q 20/40* (2013.01)

(58) Field of Classification Search
CPC ....... G06Q 20/04; G06Q 30/04; G06Q 40/025
See application file for complete search history.

(56) References Cited

U.S. PATENT DOCUMENTS

| | | |
|---|---|---|
| 6,167,385 A | 12/2000 | Hartley-Urquhart |
| 6,941,281 B1 | 9/2005 | Johnson |
| 7,181,427 B1 | 2/2007 | DeFrancesco et al. |
| 7,353,203 B1 | 4/2008 | Kriplani et al. |
| 7,953,653 B2 | 5/2011 | Siggers et al. |
| 8,239,227 B2 | 8/2012 | Megiddo et al. |
| 8,666,847 B1 | 3/2014 | Blank et al. |
| 8,732,040 B1 | 5/2014 | Prabhune et al. |
| 8,799,133 B2 | 8/2014 | Gula, IV |
| 9,727,912 B1 | 8/2017 | Poursartip et al. |
| 2002/0038277 A1 | 3/2002 | Yuan |
| 2002/0174061 A1 | 11/2002 | Srinivasan et al. |
| 2003/0101107 A1 | 5/2003 | Agarwal et al. |
| 2004/0054625 A1 | 3/2004 | Kellogg et al. |
| 2004/0064398 A1 | 4/2004 | Browne et al. |
| 2004/0193540 A1* | 9/2004 | Brown ................... G06Q 20/04 705/39 |
| 2006/0095350 A1* | 5/2006 | Hall ....................... G06Q 20/04 705/30 |
| 2007/0117601 A1 | 5/2007 | Van Luchene |
| 2007/0156579 A1* | 7/2007 | Manesh ................ G06Q 30/04 705/39 |
| 2007/0156584 A1 | 7/2007 | Barnes et al. |
| 2007/0174191 A1 | 7/2007 | Keaton et al. |
| 2007/0255635 A1 | 11/2007 | Multer et al. |
| 2007/0255653 A1 | 11/2007 | Tumminaro et al. |

(Continued)

FOREIGN PATENT DOCUMENTS

| | | |
|---|---|---|
| CA | 2 838 406 A1 | 4/2015 |
| WO | 99/03076 A1 | 1/1999 |
| WO | 2012/150985 A1 | 11/2012 |

OTHER PUBLICATIONS

Non-Final Office Action mailed on Jun. 17, 2016, for U.S. Appl. No. 14/491,965, of Poursartip, A., et al., filed Sep. 19, 2014.

(Continued)

*Primary Examiner* — Talia Crawley
(74) *Attorney, Agent, or Firm* — Lee & Hayes, PLLC (57) ABSTRACT

Merchants may desire to save for a variety of reasons, such as to purchase a new piece of equipment for use at the merchant, to pay vendors for services provided to the merchant, to set up a "rainy-day fund", or the like. As such, described herein are techniques and arrangements for helping a merchant reach its savings goals by automatically saving, for the merchant, a portion of each transaction made by the merchant at a point-of-sale (POS) device of the merchant.

20 Claims, 4 Drawing Sheets

(56) References Cited

U.S. PATENT DOCUMENTS

| | | | |
|---|---|---|---|
| 2008/0033825 | A1 | 2/2008 | Goldin |
| 2008/0052229 | A1 | 2/2008 | Sheinker et al. |
| 2008/0109348 | A1 | 5/2008 | Saxena et al. |
| 2008/0154769 | A1 | 6/2008 | Anderson et al. |
| 2009/0043697 | A1 | 2/2009 | Jacobs et al. |
| 2010/0032308 | A1 | 2/2010 | Qi et al. |
| 2010/0228651 | A1 | 9/2010 | Becerra et al. |
| 2010/0268667 | A1 | 10/2010 | King et al. |
| 2010/0299251 | A1* | 11/2010 | Thomas ............... G06Q 20/10 705/39 |
| 2010/0306071 | A1* | 12/2010 | Kay .................... G06Q 20/207 705/19 |
| 2011/0055056 | A1 | 3/2011 | Kwatinetz |
| 2011/0202445 | A1 | 8/2011 | Torres |
| 2011/0251870 | A1 | 10/2011 | Tavares et al. |
| 2012/0011071 | A1 | 1/2012 | Pennock et al. |
| 2012/0022945 | A1 | 1/2012 | Falkenborg et al. |
| 2012/0054097 | A1 | 3/2012 | Frohwein et al. |
| 2012/0066033 | A1 | 3/2012 | Frohwein et al. |
| 2012/0089436 | A1 | 4/2012 | Tavares et al. |
| 2012/0143649 | A1 | 6/2012 | Aubertin |
| 2012/0191525 | A1 | 7/2012 | Singh et al. |
| 2012/0209734 | A1 | 8/2012 | Brooks et al. |
| 2012/0226595 | A1 | 9/2012 | Torres |
| 2012/0233010 | A1 | 9/2012 | Frohwein et al. |
| 2012/0233090 | A1 | 9/2012 | Tavares et al. |
| 2012/0239552 | A1 | 9/2012 | Harycki |
| 2012/0271765 | A1 | 10/2012 | Cervenka et al. |
| 2013/0054484 | A1 | 2/2013 | Hoeflinger et al. |
| 2013/0085804 | A1 | 4/2013 | Leff et al. |
| 2013/0124432 | A1 | 5/2013 | Thibodeau |
| 2013/0138544 | A1 | 5/2013 | Chapman |
| 2013/0185228 | A1 | 7/2013 | Dresner et al. |
| 2013/0204664 | A1 | 8/2013 | Romagnolo et al. |
| 2013/0226688 | A1 | 8/2013 | Harvilicz et al. |
| 2013/0268417 | A1 | 10/2013 | Sgueglia |
| 2013/0332265 | A1 | 12/2013 | Sossaman, II et al. |
| 2014/0006202 | A1 | 1/2014 | Frohwein et al. |
| 2014/0025473 | A1 | 1/2014 | Cohen |
| 2014/0032298 | A1 | 1/2014 | Corrie et al. |
| 2014/0032307 | A1 | 1/2014 | Corrie et al. |
| 2014/0032308 | A1 | 1/2014 | Corrie et al. |
| 2014/0032309 | A1 | 1/2014 | Corrie et al. |
| 2014/0032310 | A1 | 1/2014 | Corrie et al. |
| 2014/0040157 | A1 | 2/2014 | Cohen et al. |
| 2014/0052668 | A1 | 2/2014 | Cameron |
| 2014/0058804 | A1 | 2/2014 | Zhou et al. |
| 2014/0143120 | A1 | 5/2014 | Clarke et al. |
| 2014/0143124 | A1 | 5/2014 | Sanders |
| 2014/0143405 | A1 | 5/2014 | Pavlidis et al. |
| 2014/0164049 | A1 | 6/2014 | Yakos et al. |
| 2014/0171039 | A1 | 6/2014 | Bjontegard |
| 2014/0229397 | A1 | 8/2014 | Fink |
| 2014/0244361 | A1 | 8/2014 | Zhang et al. |
| 2014/0244486 | A1 | 8/2014 | Abril |
| 2014/0279682 | A1 | 9/2014 | Feldman |
| 2014/0304137 | A1 | 10/2014 | Olson et al. |
| 2014/0316823 | A1 | 10/2014 | Cooper |
| 2014/0344037 | A1 | 11/2014 | Dunbar et al. |
| 2014/0351116 | A1 | 11/2014 | Hoff |
| 2014/0358766 | A1* | 12/2014 | Nayyar ............... G06Q 40/025 705/38 |
| 2015/0039490 | A1 | 2/2015 | Forrester et al. |
| 2015/0100475 | A1 | 4/2015 | Cummings et al. |
| 2015/0149333 | A1 | 5/2015 | Yaplee et al. |
| 2015/0161606 | A1 | 6/2015 | Lee |
| 2015/0170286 | A1 | 6/2015 | Gingell et al. |

OTHER PUBLICATIONS

Non-Final Office Action mailed on Jun. 17, 2016, for U.S. Appl. No. 14/622,605, of Scott, J.B., et al., filed Feb. 13, 2015.
Final Office Action mailed on Aug. 3, 2016, for U.S. Appl. No. 14/663,209, of Boates, B., et al., filed Mar. 19, 2015.
Non-Final Office Action mailed on Jan. 8, 2015, for U.S. Appl. No. 14/491,958, of Poursartip, A., et al., filed Sep. 19, 2014.
Non-Final Office Action mailed on Mar. 27, 2015, for U.S. Appl. No. 14/491,965, of Poursartip, A., et al., filed Sep. 19, 2014.
Non-Final Office Action mailed on Mar. 27, 2015, for U.S. Appl. No. 14/491,967, of Poursartip, A., et al., filed Sep. 19, 2014.
Final Office Action mailed on May 20, 2015, for U.S. Appl. No. 14/491,958, of Poursartip, A., et al., filed Sep. 19, 2014.
Advisory Action mailed on Jul. 27, 2015, for U.S. Appl. No. 14/491,958, of Poursartip, A., et al., filed Sep. 19, 2014.
Non-Final Office Action mailed on Aug. 27, 2015, for U.S. Appl. No. 14/675,127, of Shearer, D.J., et al., filed Mar. 31, 2015.
Non-Final Office Action mailed on Oct. 8, 2015, for U.S. Appl. No. 14/167,931, of Brock, Z., et al., filed Jan. 29, 2014.
Final Office Action mailed on Oct. 8, 2015, for U.S. Appl. No. 14/491,967, of Poursartip, A., et al., filed Sep. 19, 2014.
Final Office Action mailed on Nov. 6, 2015, for U.S. Appl. No. 14/491,965, of Poursartip, A., et al., filed Sep. 19, 2014.
Non-Final Office Action mailed on Jan. 5, 2016, for U.S. Appl. No. 14/491,958, of Poursartip, A., et al., filed Sep. 19, 2014.
Non-Final Office Action mailed on Jan. 13, 2016, for U.S. Appl. No. 14/663,209, of Boates, B., et al., filed Mar. 19, 2015.
Non-Final Office Action mailed on Jan. 21, 2016, for U.S. Appl. No. 14/675,257, of Shearer, D. J., et al., filed Mar. 31, 2015.
Final Office Action mailed on Mar. 31, 2016, for U.S. Appl. No. 14/675,127, of Shearer, D. J., et al., filed Mar. 31, 2015.
Non-Final Office Action mailed on Apr. 27, 2016, for U.S. Appl. No. 14/616,515, of Boates, B., et al., filed Feb. 6, 2015.
Non-Final Office Action mailed on May 5, 2016, for U.S. Appl. No. 14/491,967, of Poursartip, A., et al., filed Sep. 19, 2014.
Final Office Action mailed on May 12, 2016, for U.S. Appl. No. 14/167,931, of Brock, Z., et al., filed Jan. 29, 2014.
Giusti, A.C., "Want More Revenue! Enhance the Offers: Carefully matching merchants with the right products and ensuring agents know them well can dictate how much an ISO may earn from value-added services," ISO & Agent 7.4, dated May 1, 2011, pp. 2.
Leung, L., "PayPal ramps up small-business loans," The Orange County register, Journal—Gazette [Ft. Wayne, Ind], dated Feb. 10, 2014, pp. 2.
Non-Final Office Action mailed Dec. 19, 2016, for U.S. Appl. No. 14/491,965, of Poursartip, A., et al., filed Sep. 19, 2014.
Non-Final Office Action mailed Jan. 11, 2017, for U.S. Appl. No. 14/167,931, of Brock, Z., filed Jan. 29, 2014.
Examiner's Answer to Appeal Brief mailed Jan. 27, 2017, for U.S. Appl. No. 14/491,958, of Poursartip, A., et al., filed Sep. 19, 2014.
Non-Final Office Action mailed Feb. 10, 2017, for U.S. Appl. No. 14/622,605, of Scott, J.B., et al., filed Feb. 13, 2015.
Final Rejection mailed Feb. 17, 2017, for U.S. Appl. No. 14/616,515, of Boates, B., et al., filed Feb. 6, 2015.
Final Office Action mailed Oct. 21, 2016, for U.S. Appl. No. 14/491,967, of Poursartip, A., et al., filed Sep. 19, 2014.
Non-Final Office Action mailed Nov. 3, 2016, for U.S. Appl. No. 14/675,127, of Shearer, D.J., et al., filed Mar. 31, 2015.
Non-Final Office Action mailed Nov. 28, 2016, for U.S. Appl. No. 14/491,963, of Poursartip, A., et al., filed Sep. 19, 2014.
Final Office Action mailed Oct. 7, 2016, for U.S. Appl. No. 14/675,257, of Shearer, D. J., et al., filed Mar. 31, 2015.
Non-Final Office Action dated Mar. 1, 2017, for U.S. Appl. No. 14/616,520, of Boates, B., et al., filed Feb. 6, 2015.
Notice of Allowance dated Mar. 30, 2017, for U.S. Appl. No. 14/491,967, of Poursartip, A., et al., filed Sep. 19, 2014.
Final Office Action dated Apr. 10, 2017, for U.S. Appl. No. 14/675,127, of Shearer, D.J., et al., filed Mar. 31, 2015.
"Oracle Retail Advanced Inventory Planning," www.oracle.com, pp. 1-2 (2013).
Barr, A., "Update 5—Amazon offering loans to its on line sellers," www.reuters.com, dated Sep. 27, 2012, Retrieved from the Internet URL: http://www.reuters.com/article/amazon-lending-idUSL1E8KRA1020120927?type=companyNews, on Jun. 1, 2017, pp. 1-4.
Non-Final Office Action dated May 10, 2017, for U.S. Appl. No. 14/602,486, of Fern, A.J., et al., filed Jan. 22, 2015.

(56) References Cited

OTHER PUBLICATIONS

Non-Final Office Action dated May 16, 2017, for U.S. Appl. No. 14/676,678, of Scott, J.B., et al., filed Apr. 1, 2015.
Notice of Allowance dated May 25, 2017, for U.S. Appl. No. 14/663,209, of Boates, B., et al., filed Mar. 19, 2015.
Notice of Allowance dated May 31, 2017, for U.S. Appl. No. 14/675,257, of Shearer, D.J., et al., filed Mar. 31, 2015.
Notice of Allowance dated Jun. 7, 2017, for U.S. Appl. No. 14/491,963, of Poursartip, A., et al., filed Sep. 19, 2014.
Agrawal, A., et al., "Some Simple Economics of Crowdfunding," University of Toronto, dated Jun. 1, 2013, pp. 1-46.
Steinberg, S., and Demaria, R., "The Crowdfunding Bible: How to raise money for any startup, video game or project," Read.Me, dated 2012, pp. 1-47.
Notice of Allowance dated Jul. 24, 2017, for U.S. Appl. No. 14/616,515, of Boates, B. et al., filed Feb. 6, 2015.
Notice of Allowance dated Jul. 25, 2017, for U.S. Appl. No. 14/167,931, of Brock, Z., filed Jan. 29, 2014.
Final Office Action dated Jul. 27, 2017, for U.S. Appl. No. 14/491,965, of Poursartip, A., et al., filed Sep. 19, 2014.

\* cited by examiner

INTELLIGENT DIVISION OF FUNDS ACROSS MERCHANT ACCOUNTS

BACKGROUND

In today's commerce, merchants often utilize an array of different point-of-sale (POS) devices that work with one or more payment services to authorize payment instruments for transactions conducted at the merchants. For instance, a taxi driver may use a POS device to charge a passenger for a taxi ride. In another example, a street vendor may use a mobile POS device to charge a customer for an item purchased from the street vendor. While this infrastructure aids merchants in conducting customer-to-merchant transactions, this infrastructure may support other merchant goals.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Merchants may desire to save for a variety of reasons, such as to purchase a new piece of equipment for use at the merchant, to pay vendors for services provided to the merchant, to set up a "rainy-day fund", or the like. As such, described herein are techniques and arrangements for helping a merchant reach its savings goals by automatically saving, for the merchant, a portion of each transaction made by the merchant at a point-of-sale (POS) device of the merchant.

As described below, a merchant may utilize a POS device to perform a transaction with a customer. To do so, a customer may obtain (e.g., purchase, rent, lease, etc.) an item from the merchant in exchange for payment made to the merchant in the form of a payment instrument (e.g., a credit card, debit card, gift card, check, etc.). When the customer provides the payment instrument to the merchant, the merchant may enter payment information associated with the payment instrument into the POS device, such as by swiping the payment instrument, dipping the payment instrument, entering information from the payment instrument manually, or the like. This information may include a unique identifier associated with the payment instrument, an expiration of the payment instrument, a security code of the payment instrument, a credit card network associated with the payment instrument, or the like.

After the POS device receives the information, the POS device may provide this information to a payment service, along with a request to authorize the payment instrument for a cost of the transaction with the customer. The payment service may then attempt to authorize the payment instrument (e.g., via communication with the appropriate credit-card network in some instances) and may provide an indication to the POS device of whether or not the payment instrument was successfully authorized. If successfully authorized, then the payment service may deposit the money, less any fees charged to the merchant, into a business account of the merchant previously specified by the merchant.

As described below, however, the techniques described herein allow the merchant to save a portion of the cost of these types of transactions in a savings account of the merchant to aid the merchant in reaching their savings goals. To do so, a merchant may initially send a request to the payment service to save a portion of revenue from future sales in a savings account of the user. In some instances, the merchant sends this request via an application executable on the POS device, or in any other manner (e.g., via a website of the payment service, over the phone, etc.). In some instances, this request specifies an amount to save from each transaction, such as a percentage of the cost of the transaction (e.g., 0.5%), a constant amount (e.g., $5), or the like. In other instances, the merchant may specify a function that the payment service may use to determine how much to save in each transaction (e.g., a linear function, a stair-step function, an exponential function, or the like). In still other instances, the merchant may specify that the payment service is only to save revenue for transactions associated with certain items, such as a certain category of items, brand of items, or items having a certain specified margin. Further, the merchant may specify dates or times of future transactions for which a portion of revenue is to be saved.

In other instances, meanwhile, the merchant may specify a desired total savings amount, leaving the payment service to determine how to best accumulate this amount of savings. In addition, the merchant may specify a date by which the merchant would like to achieve this savings goal. In these instances, the payment service may determine how to help the merchant reach this savings goal by, for instance, calculating a percentage or amount to save from one or more transactions of the merchant. For instance, the payment service may analyze past revenue of the merchant or of similar merchants to determine how best to help the merchant reach the savings goal. For example, if the merchant would like to save a specified amount of funds within the next four months, the payment service may determine total revenue from the preceding four months (or for the same four months in a prior year) and may determine what percentage of that past revenue, if saved, would have resulted in the amount specified by the savings goal. After calculating that percentage, the payment service may then save that percentage on transactions for the proceeding four months. In addition, the payment service may periodically or continuously determine whether the payment service is on track to save more, less, or approximately the specified savings goal and may adjust the saved percentage or amount accordingly. For instance, if sales are generally down after two months of the four-month saving plan, then the payment service may increase the percentage to be saved in the second two months, while if sales are generally up, then the payment service may decrease the percentage in the second two months.

In still another example, the payment service may save different amounts at different times of the year. For instance, the payment service may identify months that are relatively fruitful in sales for the merchant, such as December, and may save a relatively high percentage of revenue generated from sales during this month. Conversely, the payment service may identify months for which sales are relatively low, such as January, and may save a lesser percentage (or no percentage) of sales made during this month.

In this and other examples, the merchant may simply specify an amount of money needed by the merchant each month, which may be constant for all months or may vary across months. The payment service may then begin saving, in the merchant's savings account, some or all funds received over these amounts each month.

Regardless of whether the merchant specifies the amount to save from the transactions or whether the payment service calculates this amount, a portion of revenue generated from future sales of the merchant may be saved to aid the merchant in achieving its savings goals. Therefore, after the merchant requests to save a portion of this future revenue, a merchant may engage in a transaction with a customer and, therefore, may receive, at the POS device of the merchant, payment information associated with a payment instrument of the customer. After receiving this payment information, the POS device may send this information to the payment service for authorizing the payment instrument for the cost of the transaction.

Upon receiving the request to authorize the payment instrument (and the corresponding payment information), the payment service may attempt to authorize the payment instrument for the cost of the transaction. Further, the payment service may calculate a fee to charge the merchant for the authorizing, if any. In some instances, the payment service may charge the merchant a fee equal to a percentage of the cost of the transaction for authorizing the payment instrument. In addition to calculating the fee, the payment service may calculate an amount of saved funds from the cost of the transaction to deposit into a specified savings account of the merchant. Again, this may represent a percentage of the cost of the transaction or a set amount.

Thereafter, the payment service may deposit its fee income into a financial account of the payment service, the saved funds into a savings account of the merchant, and the remaining funds into a pre-specified business account of the merchant. By depositing a portion of some or all of these transactions into the savings account of the merchant, the payment service may aid the merchant in reaching its savings goals.

In some instances, the funds in the savings account may be purposely inaccessible to the merchant until one or more conditions are met, as specified by the merchant. For instance, the merchant may indicate, to the payment service or to a financial institution holding the account, that the funds in the savings account are not to be accessible to the merchant until a specified date or until the balance of the savings account reaches a threshold balance. Upon reaching the specified date or the specified balance, the merchant may gain access to these saved funds.

In other instances, meanwhile, the payment service may pay a vendor, from the saved funds, on behalf of the merchant for services provided to the merchant. For instance, a merchant may request that the payment service pay a landlord of a physical premises of the merchant on the first of every month or when the balance of the savings account reaches a specified balance. Therefore, a merchant is able to "chip away" at payments owed to vendors by automatically saving a portion of some or all transactions made by the merchant and by having an external entity automatically pay the vendor upon the reaching of one or more conditions.

In some instances, the payment service may initiate saving by, for example, suggesting that the merchant begin saving some portion of future revenue. For instance, the payment service may suggest that the merchant save funds for a particular new piece of equipment. For instance, the payment service may determine that other merchants that are similar (e.g., in industry, in total revenue or profit, etc.) eventually purchase a particular piece of equipment and, therefore, may suggest that the merchant at hand begin saving for this equipment. If the merchant agrees, then payment service may begin saving and, upon reaching the cost of the equipment, the payment service may purchase the piece of the equipment on behalf of the merchant.

For discussion purposes, some example implementations are described below with reference to the corresponding figures. However, implementations herein are not limited to the particular examples provided, and may be extended to other environments, other system architectures, other types of merchants, and so forth, as will be apparent to those of skill in the art in light of the disclosure herein.

Figure 1:
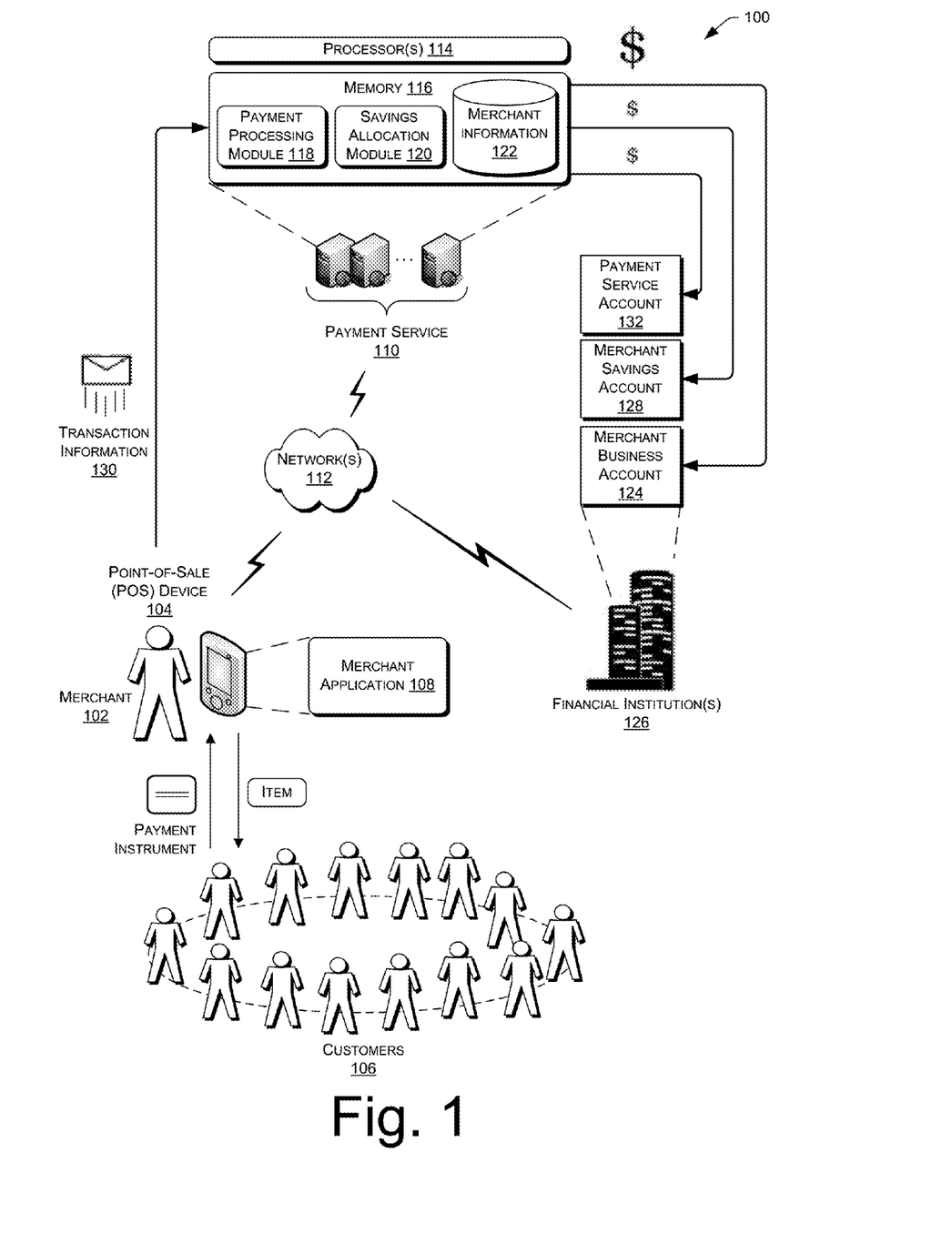
FIG. 1 illustrates an example environment that includes a merchant operating a point-of-sale (POS) device to conduct transactions with multiple different customers, as well as a payment service to authorize payment instruments of the customers. In some instances, when a merchant requests that the payment service authorize a payment instrument for the cost of a transaction with the customer, the payment service automatically saves, at the merchant's request, a portion of the cost in a savings account of the merchant. By doing so, the merchant builds funds in a savings account automatically through conducting of payment transactions using the POS device.

FIG. 1 illustrates an example environment 100 that includes a merchant 102 operating a point-of-sale (POS) device 104 to engage in various transactions with respective customers 106. The POS device 104 may comprise any sort of mobile or non-mobile device that includes an instance of a merchant application 108 that executes on the respective device. The merchant application 108 may provide POS functionality to the POS device 104 to enable the merchant 102 (e.g., an owner, employees, etc.) to accept payments from the customers 106. In some types of businesses, the POS device 104 may correspond to a store or other place of business of the merchant, and thus, may be a fixed location that typically does not change on a day-to-day basis. In other types of businesses, however, the POS device 104 may change from time to time, such as in the case that the merchant operates a food truck, is a street vendor, is a cab driver, etc., or has an otherwise mobile business, e.g., in the case of merchants who sell items at buyer's homes, places of business, and so forth.

As used herein, a merchant may include any business engaged in the offering of goods or services for acquisition by customers. Actions attributed to a merchant may include actions performed by owners, employees, or other agents of the merchant and thus no distinction is made herein unless specifically discussed. In addition, as used herein, a customer may include any entity that acquires goods or services from a merchant, such as by purchasing, renting, leasing, borrowing, licensing, or the like. Hereinafter, goods and/or services offered by merchants may be referred to as items. Thus, a merchant and a customer may interact with each other to conduct a transaction in which the customer acquires an item from a merchant, and in return, the customer provides payment to the merchant.

As used herein, a transaction may include a financial transaction for the acquisition of goods and/or services that is conducted between a customer and a merchant. For example, when paying for a transaction, the customer can provide the amount that is due to the merchant using a payment instrument (e.g., a debit card, a credit card, a stored-value or gift card, a check, through an electronic payment application on a device carried by the customer, or the like). The merchant can interact with the POS device 104 to process the transaction, such as by inputting (e.g., manually, via a magnetic card reader or an RFID reader, etc.) an identifier associated with the payment instrument. For example, a payment instrument of one of the customers 106 may include one or more magnetic strips for providing card and customer information when swiped in a card reader. In other examples, other types of payment cards may be used, such as smart cards having a built-in memory chip that is read by the device 104 when the card is "dipped" into the reader, a radiofrequency identification tag, or so forth.

During the transaction, the POS device 104 can determine transaction information describing the transaction, such as the identifier of the payment instrument, an amount of payment received from the customer, the item(s) acquired by the customer, a time, place and date of the transaction, a card network associated with the payment instrument, an issuing bank of the payment instrument, and so forth. The POS device 104 can send the transaction information to a payment service 110 over a network 112, either substantially contemporaneously with the conducting of the transaction (in the case of online transactions) or later when the device 104 is in the online mode (in the case offline transactions).

In an offline transaction, the POS device 104 may store one or more characteristics associated with the transaction (i.e., the transaction information), such as a cost of the transaction, a time of day at which the transaction occurred, a day of the week at which the transaction occurred, a location at which the transaction took place, an item that the customer obtained, and a payment instrument used in the transaction. After conducting an offline transaction with one of the customers 106, the POS device 104 may provide the stored information to the payment service 110 over the network 112. The network 112 may represent any one or more wired or wireless networks, such as a WiFi network, a cellular network, or the like. In an online transaction, the POS device may send this information to the payment service 110 over the network 112 substantially contemporaneously with the transaction with the customer.

As illustrated, the payment service 110 may include one or more processors 114 and memory 116, which may store a payment processing module 118, a savings allocation module 120, and merchant information 122, which may include, amongst other things, historical revenue at the merchant and/or similarly situated merchants. The payment processing module 118 may function to receive the information regarding a transaction from the POS device 104 and attempt to authorize the payment instrument used to conduct the transaction. The payment processing module 118 may then send an indication of whether the payment instrument has been approved or declined back to the POS device 104.

Generally, when a customer and a merchant enter into an electronic payment transaction, the transaction is processed by electronically transferring funds from a financial account associated with the customer to a financial account associated with the merchant, such as illustrated business account 124 maintained at example financial institution 126. As such, the payment processing module 118 may communicate with one or more computing devices of a card network (or "card payment network"), e.g., MasterCard®, VISA®, over the network 112 to conduct financial transactions electronically. The payment processing module 118 can also communicate with one or more computing devices of one or more banks over the network 112. For example, the payment processing module 118 may communicate with an acquiring bank, and/or an issuing bank, and/or a bank maintaining customer accounts for electronic payments.

An acquiring bank may be a registered member of a card association (e.g., Visa®, MasterCard®), and may be part of a card payment network. An issuing bank may issue credit cards to buyers, and may pay acquiring banks for purchases made by cardholders to which the issuing bank has issued a payment card. Accordingly, in some examples, the computing device(s) of an acquiring bank may be included in the card payment network and may communicate with the computing devices of a card-issuing bank to obtain payment. Further, in some examples, the customer may use a debit card instead of a credit card, in which case, the bank computing device(s) of a bank corresponding to the debit card may receive communications regarding a transaction in which the customer is participating. Additionally, there may be computing devices of other financial institutions involved in some types of transactions or in alternative system architectures, and thus, the foregoing are merely several examples for discussion purposes.

In contrast to traditional payment processing, however, the savings allocation module 120 of the payment service 110 may allocate funds received as part of a transaction made at the POS device 104 between the business account 124 of the merchant and a savings account 128 of the merchant. As described above, the merchant 102 may utilize the merchant application 108 to request that the payment service 110 save a portion of proceeds from transactions made with the customer community 106. For instance, the merchant 102 may request that savings allocation module 120 deposit a certain percentage or raw amount of some or each transaction into the savings account 128, with a remainder of the merchant's funds going into the business account 124. The merchant 102 may also specify that the funds in the savings account are not to be accessible to the merchant 102 until a certain date and/or until the balance in the savings account reaches a threshold balance. In some instances, the financial institution 126 may hold the savings account 128 and, hence, many enforce these constraints at the merchant's direction (e.g., via the payment service 110), while in other instances the payment service 110 may hold the savings account 128 and, therefore, may enforce the merchant-specified constraints.

Further, in some instances the savings allocation module may determine how to save from the transactions made at the POS device 104 in order to reach merchant-specified savings goals. For instance, the merchant 102 may specify that he or she would like to save a certain amount of money in the savings account 128 by a certain date. The module 120 may then analyze historical revenue of the merchant, or similarly situated merchants, using the merchant information 122 to determine how much to save on a per-transaction basis to reach the specified amount by the specified date. This may include calculating a set percentage, calculating multiple percentages to be applied to different time frames and/or different items, saving a minimum amount on each transaction or item, saving a maximum amount on each transaction or item, or the like.

To illustrate, FIG. 1 illustrates that the merchant 102 may engage in a transaction with an example customer 106. After the POS device 104 receives the payment instrument, the POS device 104 may provide transaction information (e.g., information associated with the payment instrument, cost of the transaction, etc.) 130 to the payment service 110. In response to receiving the transaction information, payment processing module 118 may attempt to authorize the payment instrument for the cost of the transaction. The module 118 may then provide an indication back to the POS device 104 indicating whether or not the instrument was successfully authorized. In addition, the payment processing module 118 may calculate a fee that the payment service 110 is to charge (if any) for authorizing the payment instrument. The payment service 110 may sometime thereafter deposit an amount of money equal to the fee into a payment service account 132 maintained at some financial institution, such as the example financial institution 126.

In addition, the savings allocation module 120 may receive an indication that an authorization request has been received from the POS device 104. The module 120 may identify the POS device 104 and/or the merchant 102 and may determine whether or not the merchant 102 has previously requested to save funds for transactions such as the current transaction. If so, then the savings allocation module 120 may calculate an amount to deposit into the savings account 128 of the merchant 102. This amount may be based on a total cost of the transaction, a date or time of the transaction, a particular item(s) sold as part of the transaction, or the like. In any event, after calculating the amount of saved funds, the savings allocation module 120 may deposit the saved funds into the savings account 128 for later use by the merchant 102. Finally, the payment service 110 may deposit the remaining amount of funds (i.e., the total cost of the transaction less the fee and less the saved funds) into one or more pre-specified merchant business accounts 124.

Figure 2A:
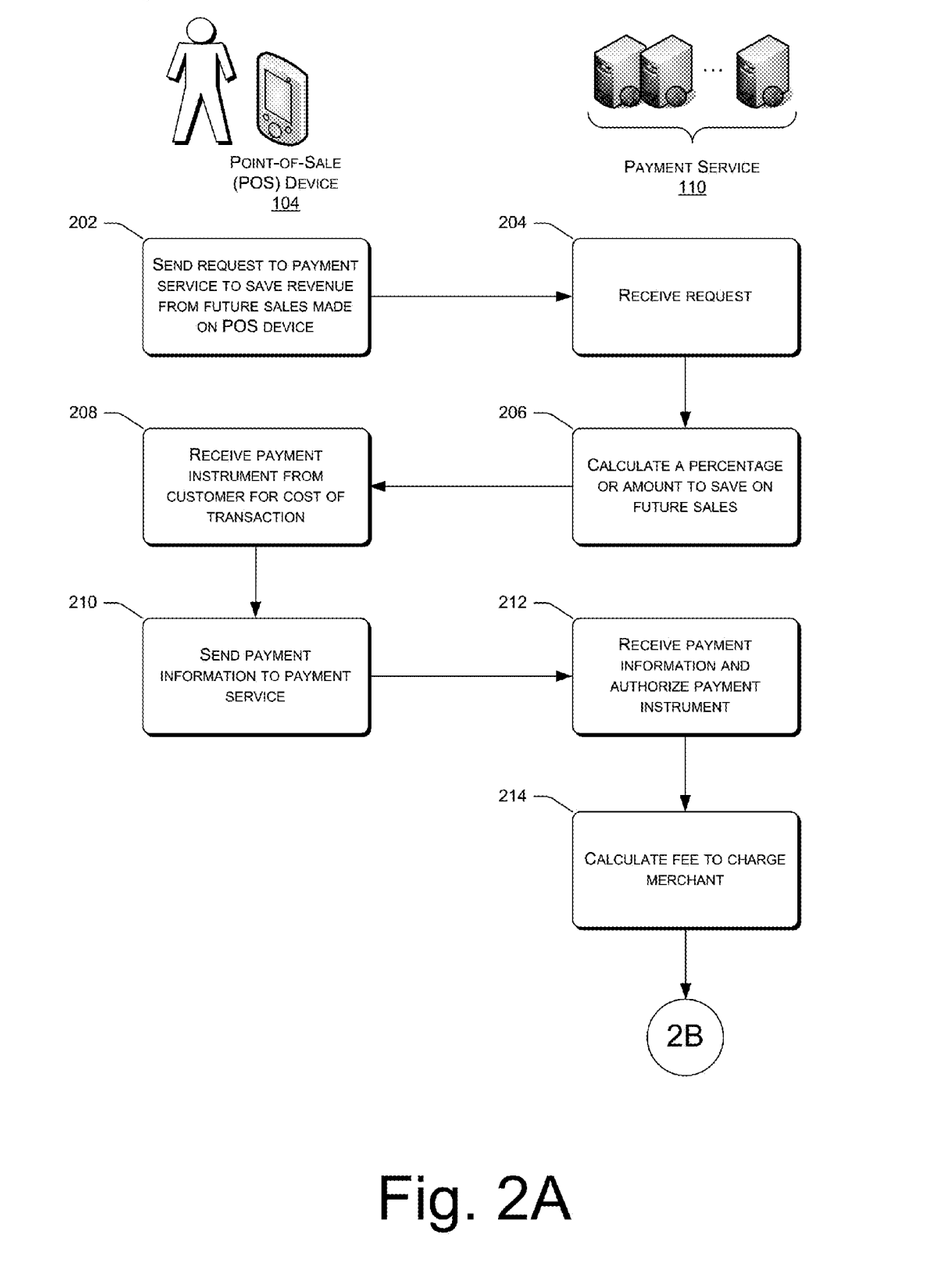
FIGS. 2A-B illustrate a flow diagram of a process for automatically saving funds for a merchant from revenue from sales made by the merchant. As the merchant sells items, the amount of funds in the savings account continues to build.
Figure 2B:
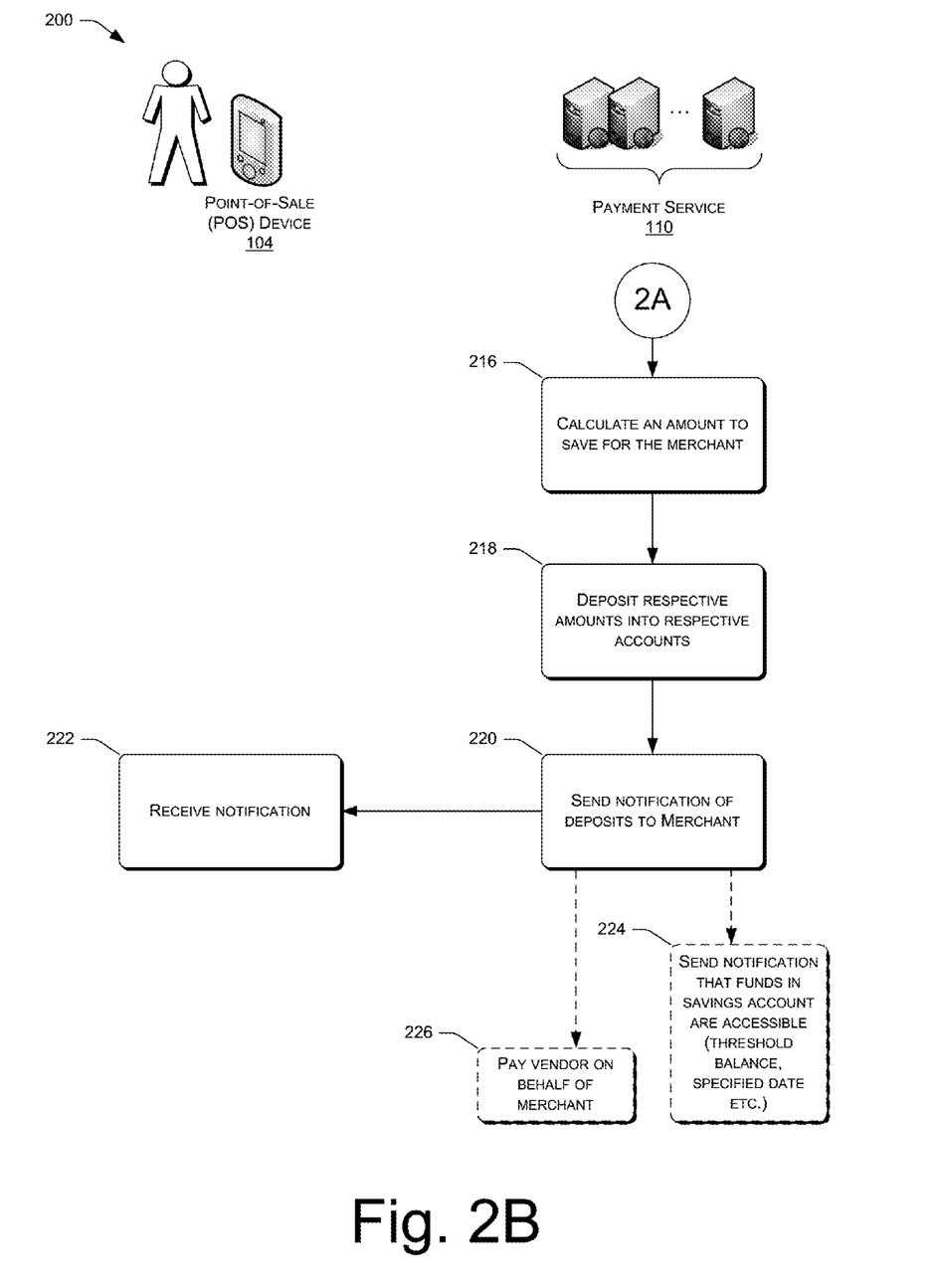

FIGS. 2A-B illustrate a flow diagram of a process 200 for automatically saving funds for a merchant from revenue from sales made by the merchant. As the merchant sells items, the amount of funds in the savings account continues to build.

The process 200 and other processes described herein are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems. The process 200, and other processes described herein, may be performed by a POS device, by a remote payment service (e.g., payment service 110), by another entity, or by a combination thereof. In some examples, the POS device 104 may perform the operations illustrated underneath the POS device 104, while the payment service 110 may perform operations illustrated beneath it.

FIG. 2A illustrates an operation 202, which represents the POS device 104 of the merchant 102 sending a request to the payment service to save revenue from future sales of the merchant 102 made on the POS device 104. The payment service 110 receives this request at 204 and, at 206, calculates a percentage (or raw amount) to save on the future sales on behalf of the merchant. For instance, the payment service 110 may analyze past revenue from the merchant 102 to determine how best to reach a savings goal of the merchant. Additionally or alternatively, the payment service 110 may analyze past revenue of other similarly situated merchants, such as merchants in the same line of business as the merchant, in the same geography as the merchant 102, having similar revenues or size as the merchant 102, or the like. Of course, while FIG. 2 illustrates the payment service 110 calculating the percentage or other amount to save in future transactions of the merchant 102, in some instances the merchant 102 itself may specify this percentage or amount.

At 208, the POS device 104 receives a payment instrument from a customer to pay for a cost of a transaction between the merchant 102 and the customer. At 210, the POS device 104 sends payment information associated with the payment instrument to the payment service 110, sending this information along with details associated with the transaction (e.g., cost) and a request to authorize the payment instrument for the cost of the transaction. At 212, the payment service 110 receives this information.

At 214, the payment service 110 calculates a fee to charge the merchant for authorizing the payment instrument. In some instances, this fee comprises a percentage of the cost of the transaction, while in other instances this fee may comprise a preset amount.

FIG. 2B continues the illustration of the process 200 and includes, at 216, calculating an amount of the transaction between the customer and the merchant to save on behalf of the merchant. This amount may be based on the total cost of the transaction and based on the calculating performed at 206. At 218, the payment service deposits the respective amounts into the respective accounts. For instance, the payment service 110 may deposit the payment service's fee into an account of the payment service 110, may deposit the saved amount into a savings account of the merchant 102, and may deposit the remaining amount into a pre-specified business account of the merchant 102. At 220, the payment service may send a notification of some or all of these deposits to the POS device 104 or other device of the merchant, which receives this notification at 222.

Sometime thereafter, at 224 the payment service 110 may send a notification to the merchant 102 indicating that the funds in the savings account are accessible to the merchant. For instance, if the merchant had specified that the funds are not to be accessible until a specified date, then the payments service may send this notification on the specified date. Or, if the merchant 102 had indicated that the funds are not accessible until the savings account reaches a certain balance, then the payment service 110 may send this notification upon the savings account reaching the specified balance. Additionally or alternatively, the payment service 110 may pay a vendor on behalf of the merchant 102 at 226, at the request of the merchant 102, as described above.

Figure 3:
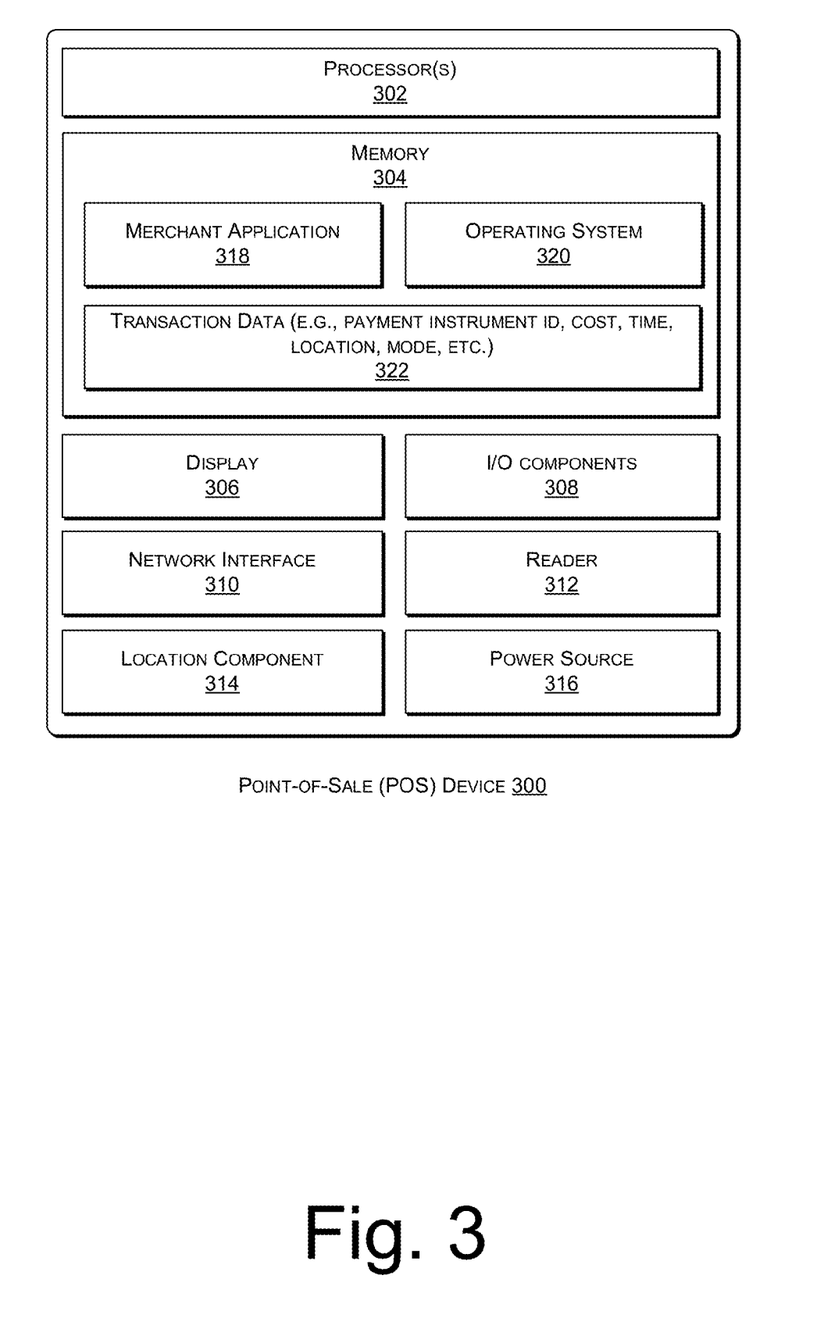
FIG. 3 illustrates select components of a POS device that a merchant described herein may utilize.

FIG. 3 illustrates select example components of an example POS device 300 according to some implementations. The POS device 300 may be any suitable type of computing device, e.g., mobile, semi-mobile, semi-stationary, or stationary. Some examples of the POS device 300 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; or other computing devices capable of sending communications and performing the functions according to the techniques described herein.

In the illustrated example, the POS device 300 includes at least one processor 302, memory 304, a display 306, one or more input/output (I/O) components 308, one or more network interfaces 310, at least one card reader 312, at least one location component 314, and at least one power source 316. Each processor 302 may itself comprise one or more processors or processing cores. For example, the processor 302 can be implemented as one or more microprocessors, microcomputers, microcontrollers, digital signal processors, central processing units, state machines, logic circuitries, and/or any devices that manipulate signals based on operational instructions. In some cases, the processor 302 may be one or more hardware processors and/or logic circuits of any suitable type specifically programmed or configured to execute the algorithms and processes described herein. The processor 302 can be configured to fetch and execute computer-readable processor-executable instructions stored in the memory 304.

Depending on the configuration of the POS device 300, the memory 304 may be an example of tangible non-transitory computer storage media and may include volatile and nonvolatile memory and/or removable and non-removable media implemented in any type of technology for storage of information such as computer-readable processor-executable instructions, data structures, program modules or other data. The memory 304 may include, but is not limited to, RAM, ROM, EEPROM, flash memory, solid-state storage, magnetic disk storage, optical storage, and/or other computer-readable media technology. Further, in some cases, the POS device 300 may access external storage, such as RAID storage systems, storage arrays, network attached storage, storage area networks, cloud storage, or any other medium that can be used to store information and that can be accessed by the processor 302 directly or through another computing device or network. Accordingly, the memory 304 may be computer storage media able to store instructions, modules or components that may be executed by the processor 302. Further, when mentioned, non-transitory computer-readable media exclude media such as energy, carrier signals, electromagnetic waves, and signals per se.

The memory 304 may be used to store and maintain any number of functional components that are executable by the processor 302. In some implementations, these functional components comprise instructions or programs that are executable by the processor 302 and that, when executed, implement operational logic for performing the actions and services attributed above to the POS device 300. Functional components of the POS device 300 stored in the memory 304 may include a merchant application 318, discussed above. The merchant application 318 may present an interface on the POS device 300 to enable the merchant to conduct transactions, receive payments, and so forth, as well as communicating with the payment service 110 for processing payments and sending transaction information. Further, the merchant application 318 may present an interface to enable the merchant to manage the merchant's account, and the like. The merchant application 318 may also facilitate automatic savings of portions of future revenue, as described above with reference to FIGS. 1 and 2A-B.

Additional functional components may include an operating system 320 for controlling and managing various functions of the POS device 300 and for enabling basic user interactions with the POS device 300. The memory 304 may also store transaction data 322 that is received based on the merchant associated with the POS device 300 engaging in various transactions with customers, such as the example customers 106 from FIG. 1.

In addition, the memory 304 may also store data, data structures and the like, that are used by the functional components. For example, this data may include item information that includes information about the items offered by the merchant, which may include images of the items, descriptions of the items, prices of the items, and so forth. Depending on the type of the POS device 300, the memory 304 may also optionally include other functional components and data, which may include programs, drivers, etc., and the data used or generated by the functional components. Further, the POS device 300 may include many other logical, programmatic and physical components, of which those described are merely examples that are related to the discussion herein.

The network interface(s) 310 may include one or more interfaces and hardware components for enabling communication with various other devices over the network or directly. For example, network interface(s) 310 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

FIG. 3 further illustrates that the POS device 300 may include the display 306 mentioned above. Depending on the type of computing device used as the POS device 300, the display 306 may employ any suitable display technology. For example, the display 306 may be a liquid crystal display, a plasma display, a light emitting diode display, an OLED (organic light-emitting diode) display, an electronic paper display, or any other suitable type of display able to present digital content thereon. In some examples, the display 306 may have a touch sensor associated with the display 306 to provide a touchscreen display configured to receive touch inputs for enabling interaction with a graphic interface presented on the display 306. Accordingly, implementations herein are not limited to any particular display technology. Alternatively, in some examples, the POS device 300 may not include the display 306, and information may be present by other means, such as aurally.

The I/O components 308, meanwhile, may include speakers, a microphone, a camera, and various user controls (e.g., buttons, a joystick, a keyboard, a keypad, etc.), a haptic output device, and so forth.

In addition, the POS device 300 may include or may be connectable to a payment instrument reader 312. In some examples, the reader 312 may plug in to a port in the merchant device, such as a microphone/headphone port, a data port, or other suitable port. In other instances, the reader 312 is integral with the entire POS device 300. The reader may include a read head for reading a magnetic strip of a payment card, and further may include encryption technology for encrypting the information read from the magnetic strip. Alternatively, numerous other types of card readers may be employed with the POS devices 300 herein, depending on the type and configuration of a particular POS device 300.

The location component 314 may include a GPS device able to indicate location information, or the location component 314 may comprise another other location-based sensor. The POS device 300 may also include one or more additional sensors (not shown), such as an accelerometer, gyroscope, compass, proximity sensor, and the like. Additionally, the POS device 300 may include various other components that are not shown, examples of which include removable storage, a power control unit, and so forth.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A system comprising:
one or more processors; and
one or more computer-readable media storing computer-executable instructions that, when executed, cause the one or more processors to perform acts comprising:
receiving, from a plurality of point-of-sale (POS) devices respectively associated with a plurality of merchants, transaction information associated with a plurality of transactions;
storing first information associated with a first merchant of the plurality of merchants, the first information including at least revenue from past sales made by the first merchant, wherein the first merchant is in a first line of business;
storing second information associated with at least a second merchant of the plurality of merchants, the second information including at least revenue from past sales made by the second merchant, wherein the second merchant is in a second line of business designated as similar to the first line of business;
determining that the first merchant should save a specified amount of revenue from future sales made by the first merchant to purchase an item, wherein determining that the first merchant should save the specified amount to purchase the item is based at least in part on a purchase of the item by the second merchant;
recommending that the first merchant save the specified amount of the revenue from the future sales made by the first merchant, using a POS device associated with the first merchant, in a savings account of the first merchant;
calculating a percentage of the revenue from the future sales to save in order to save the specified amount, wherein calculating the percentage is based at least in part on the revenue from the past sales made by the first merchant;
after calculating the percentage, receiving, from the POS device, via the network, a request to authorize a transaction between the first merchant and a customer, wherein the transaction is associated with (i) payment information from a payment instrument read by a card reader, and (ii) a cost of the transaction;
authorizing, by communicating with one or more computing devices associated with one or more card payment networks, the payment instrument for the cost of the transaction;
calculating a fee to charge the first merchant for authorizing the payment instrument;
calculating a saved amount of the cost of the transaction to allocate to the savings account, the saved amount comprising the percentage times the cost of the transaction;
sending an amount associated with the fee to an account of the payment service;
sending the saved amount of funds to the savings account;
sending a remaining amount of funds to a business account of the first merchant, the remaining amount of funds comprising the cost of the transaction less the fee and less the saved amount; and
based at least in part on funds from the savings account reaching the specified amount, purchasing the item on behalf of the first merchant using at least a portion of the funds from the saving account.

2. A system as recited in claim 1, wherein calculating the percentage comprises:
determining a first amount of time in which to save the specified amount;
determining total revenue from the past sales of the first merchant during a second amount of time, the second amount of time substantially equal to the first amount of time; and
calculating the percentage as a function of the first amount of time divided by the total revenue from the past sales of the first merchant during the second amount of time.

3. A system as recited in claim 1, wherein:
the percentage comprises a first percentage;
the first percentage is for applying to the future sales made during a first period of time; and
the acts further comprise calculating a second, different percentage of revenue from the future sales made during a second period of time to save, the second period of time subsequent to the first period of time.

4. A system comprising:
one or more processors; and
one or more computer-readable media storing computer-executable instructions that, when executed, cause the one or more processors to perform acts comprising:
receiving, from a plurality of point-of-sale (POS) devices respectively associated with a plurality of merchants, transaction information associated with a plurality of transactions;
storing first information associated with a first merchant of the plurality of merchants, the first information including at least an amount of revenue from past sales at the first merchant, wherein the first merchant is in a first line of business;
storing second information associated with at least a second merchant of the plurality of merchants, the second information including at least an amount of revenue from past sales made by the second merchant, wherein the second merchant is in a second line of business designated as similar to the first line of business;
determining that the first merchant should save a specified amount of revenue from future sales made by the first merchant to purchase an item, wherein determining that the first merchant should save the specified amount to purchase the item is based at least in part on a purchase of the item by the second merchant;
recommending that the first merchant save the specified amount of revenue from the future sales made by the first merchant, using a POS device associated with the first merchant, in a savings account of the first merchant;
determining, based at least in part on the amount of revenue from the past sales at the first merchant, a percentage of the future sales to allocate to the saving account in order to save the specified amount;

after determining the percentage, receiving, from the POS device, a request to authorize a payment instrument for a cost of a transaction between the first merchant and a customer;

authorizing, by communicating with one or more computing devices associated with one or more card payment networks, the payment instrument for the cost of the transaction;

calculating a fee to charge the first merchant for authorizing the payment instrument;

calculating, based at least in part on the percentage, a saved amount of funds from the cost of the transaction to allocate to the savings account;

sending an amount associated with the fee to an account of the payment service;

sending the saved amount of funds to the savings account;

sending a remaining amount of funds to a business account of the first merchant, the remaining amount of funds comprising the cost of the transaction less the fee and less the saved amount of funds; and based at least in part on funds from the savings account reaching the specified amount, causing a purchase of the item on behalf of the first merchant using at least a portion of the funds from the savings account.

5. A system as recited in claim 4, wherein:
calculating the saved amount comprises calculating the percentage of the cost of the transaction.

6. A system as recited in claim 4, wherein determining the percentage comprises calculating the percentage of the future sales to allocate to the savings account based at least in part on the amount of revenue from the past sales at the first merchant and an indicated date at which the specified amount of the future sales must be saved, wherein the saved amount comprises the percentage of the cost of the transaction.

7. A system as recited in claim 4, the acts further comprising receiving a request to allocate future sales of a specific item to the savings account.

8. A system as recited in claim 4, the acts further comprising receiving a request indicating at least one of a minimum amount of the cost of the transaction to allocate to the savings account or a maximum amount of the cost of the transaction to allocate to the savings account.

9. A system as recited in claim 4, the acts further comprising sending, to the POS device associated with the first merchant, a suggestion that the first merchant save the specified amount to purchase the item.

10. A system as recited in claim 4, the acts further comprising:
receiving, from the POS device associated with the first merchant, a request from the first merchant to pay, using an additional portion of the funds in the savings account, a vendor for services provided by the vendor to the first merchant; and paying the vendor using the additional portion of the funds in the savings account.

11. A system as recited in claim 4, the acts further comprising causing the funds in the savings account to be made available to the first merchant on a specified date and unavailable to the first merchant prior to the specified date.

12. A system as recited in claim 4, the acts further comprising causing the funds in the savings account to be made available to the first merchant based at least in part on the funds in the savings account reaching the specified amount.

13. A method implemented at least in part by a computing device of a payments service, the method comprising:
receiving, from a plurality of point-of-sale (POS) devices respectively associated with a plurality of merchants, transaction information associated with a plurality of transactions;

storing first information associated with a first merchant of the plurality of merchants, the first information including at least past revenue of the first merchant, wherein the first merchant is in a first line of business;

storing second information associated with at least a second merchant of the plurality of merchants, the second information including at least past revenue of the second merchant, wherein the second merchant is in a second line of business designated as similar to the first line of business;

determining that the first merchant should save a specified amount of revenue from future sales made by the first merchant to purchase an item, wherein determining that the first merchant should save the specified amount to purchase the item is based at least in part on a purchase of the item by the second merchant;

recommending that the first merchant save the specified amount of revenue from the future sales at the first merchant in a savings account of the first merchant;

determining, based at least in part on the past revenue of the first merchant, a percentage of the future sales to allocate to the saving account in order to reach the specified amount;

after determining the percentage, receiving, from a POS device associated with the first merchant, a request to authorize a payment instrument of a customer for a cost of a transaction between the first merchant and the customer;

authorizing, by communicating with one or more computing devices associated with one or more card payment networks, the payment instrument for the cost of the transaction;

calculating a fee to charge the first merchant for authorizing the payment instrument;

calculating, based at least in part on the percentage, a saved amount of funds of the cost to allocate to the savings account;

sending an amount associated with the fee to an account of the payment service;

sending the saved amount of funds to the savings account;

sending a remaining amount of funds to a business account of the first merchant, the remaining amount of funds comprising the cost less the fee and less the saved amount; and based at least in part on funds from the savings account reaching the specified amount, causing a purchase of the item on behalf of the first merchant using at least a portion of the funds from the savings account.

14. A method as recited in claim 13, wherein determining the percentage comprising calculating the percentage of the future sales to allocate to the savings accounts based at least in part on the past revenue of the first merchant and a date by which the specified amount is to be saved.

15. A method as recited in claim 13, further comprising receiving a request that specifies that a fixed amount of the future sales are to be allocated to the business account of the first merchant.

16. A method as recited in claim 13, further comprising receiving a request that specifies that the percentage of the future sales are to be allocated to the savings account and that the remaining amount is to be allocated to the business account of the first merchant.

17. A method as recited in claim 13, further comprising:
receiving a request from the POS device or the another electronic device to pay, using an additional portion of the funds from the savings account, a vendor.

18. A system as recited in claim 1, the acts further comprising receiving a request that indicates at least one of a minimum amount of the cost of the transaction to allocate to the savings account or a maximum amount of the cost of the transaction to allocate to the savings account.

19. A system as recited in claim 1, wherein calculating the percentage is further based on the revenue of the past sales made by the second merchant.

20. A system as recited in claim 1, the acts further comprising sending a notification that indicates that the funds of the savings account are accessible to the first merchant.

\* \* \* \* \*